United States Patent
Otani et al.

[19]

[11] Patent Number: 5,889,912
[45] Date of Patent: Mar. 30, 1999

[54] OPTICAL WAVEGUIDE DEVICE

[75] Inventors: Toshihiro Otani; Tomoyuki Ito, both of Sapporo; Yoshinobu Kubota; Yasuhiro Omori, both of Kawasaki, all of Japan

[73] Assignee: Fujitsu Limited, Kawasaki, Japan

[21] Appl. No.: 921,014

[22] Filed: Aug. 29, 1997

[30] Foreign Application Priority Data

Mar. 18, 1997 [JP] Japan ................................ 9-064216

[51] Int. Cl.⁶ .................................................. G02B 6/10
[52] U.S. Cl. ......................... 385/129; 385/130; 385/132; 385/14
[58] Field of Search ................................ 385/129, 4, 1, 385/2, 3, 8–10, 14, 130, 131, 132, 141

[56] References Cited

U.S. PATENT DOCUMENTS 5,404,412  4/1995  Seino et al. ................................ 385/2

*Primary Examiner*—Phan T. H. Palmer
*Attorney, Agent, or Firm*—Staas & Halsey

[57] ABSTRACT

An optical waveguide device including a package housing having an element mounting surface, an element inserting groove opening to the element mounting surface, and a cutout as a space opening to an inner surface of the element inserting groove; and an optical waveguide element having a dielectric substrate, an optical waveguide formed in a surface of the dielectric substrate, and an electrode formed over the surface of the dielectric substrate, the optical waveguide element being inserted and fixed in the element inserting groove of the package housing by using an adhesive. The cutout opens also to the element mounting surface. In applying the adhesive to the bottom surface of the element inserting groove and inserting the optical waveguide element into the element inserting groove, the adhesive flows into the cutout and is prevented from flowing up to the element mounting surface. Further, a working space for application of the adhesive to the bottom surface of the element inserting groove can be ensured by the cutout.

18 Claims, 20 Drawing Sheets

F I G. 1 7
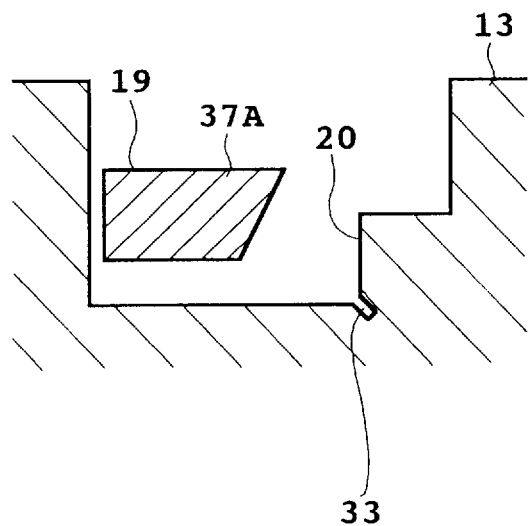
F I G. 1 8
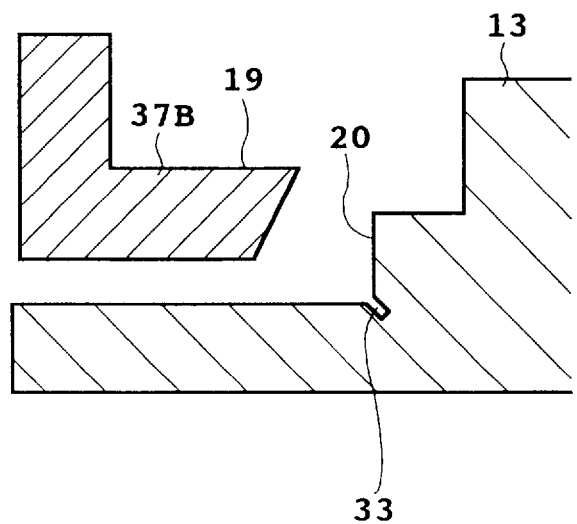

OPTICAL WAVEGUIDE DEVICE

BACKGROUND OF THE INVENTION

1. Field of the Invention

The present invention relates to an optical waveguide device including an optical waveguide element having an optical waveguide formed in the surface of a dielectric substrate, and a package housing accommodating the optical waveguide element.

2. Description of the Related Art

An optical waveguide element having an optical waveguide formed in the surface of a dielectric crystal substrate of lithium niobate ($LiNbO_3$), for example, by thermal diffusion of titanium (Ti) or its oxide, for example, has features including low loss, wide band, and mass productivity using a planar technique, and has been widely researched and developed to become practical. In particular, attention is focused on a Mach-Zehnder (branch interference type) modulator chip owing to its high-speed performance, which is configured by forming an optical waveguide and a plurality electrodes on a dielectric crystal substrate. By controlling a voltage to be applied to the electrodes, the refractive index of the optical waveguide is adjusted to thereby perform a switching operation and a modulating operation.

The Mach-Zehnder modulator chip is configured by forming an optical waveguide consisting of a pair of arm portions connected together at their opposite ends in the surface of a dielectric substrate formed of a Z-cut lithium niobate crystal, forming a buffer layer of $SiO_2$ on the optical waveguide, and forming a plurality of metal electrodes (signal electrode and ground electrode) so as to correspond to the optical waveguide. The optical waveguide is formed by thermal diffusion of titanium into the surface of the dielectric substrate to thereby increase the refractive index.

Light entering the optical waveguide from its one end is branched into two beams to reach the pair of arm portions of the optical waveguide. At this time, a drive voltage is applied to one of the electrodes, so that a phase difference is produced between the two beams in the two arm portions by the electro-optical effect (the directions of electric fields at the two arm portions are opposite to each other, so that the refractive indices of the two arm portions change in opposite directions). These two beams are combined into one beam at the other end of the optical waveguide, and this beam is taken out as an optical signal output. By applying the drive voltage so that the phase difference between the two beams becomes zero or $\pi$, an ON-OFF digital signal, for example, can be obtained.

The modulator chip as mentioned above is formed in the shape of elongated rectangular rod having dimensions of about 1×1×60 (mm), for example, and it is accommodated in a package housing formed of metal for the purposes of connection with an optical fiber of the like and protection, thus configuring an optical waveguide device. The package housing has an element mounting surface having a grounding portion to be connected to the ground electrode of the modulator chip. An element inserting groove slightly larger in size than the optical waveguide element is formed on the element mounting surface.

The optical waveguide element is fixed to the package housing by applying an adhesive to the inner surface (bottom surface) of the element inserting groove with an adhesive applicator rod and thereafter inserting the optical waveguide element into the element inserting groove. Thereafter, the ground electrode of the optical waveguide element and the grounding portion of the element mounting surface are electrically connected together by ribbon (wire) bonding. Further, the signal electrode of the optical waveguide element is electrically connected to a voltage applying terminal insulated from the package housing.

In the conventional optical waveguide device as mentioned above, the element inserting groove formed on the element mounting surface of the package housing is very thin (narrow) as having a width of about 1 mm and a depth of about 1 mm. Accordingly, the work of applying the adhesive is very difficult to carry out, so that there is a possibility that the adhesive may be applied in an excess amount or may be erroneously applied also to the side surface of the element inserting groove or other portions. Further, a gap between the opposed side surfaces of the optical waveguide element and the element inserting groove is narrow. Accordingly, in the case of erroneous application of the adhesive to the side surface of the element inserting groove or application of the adhesive in an excess amount as mentioned above, the adhesive may rise in this gap by capillarity to reach the element mounting surface, causing adverse effects on characteristics (high-frequency characteristics), reliability, and bonding ability of the optical waveguide element.

SUMMARY OF THE INVENTION

It is therefore an object of the present invention to provide an optical waveguide device which can prevent degradation in characteristics of an optical waveguide element due to flowing of an adhesive up to an element mounting surface.

It is another object of the present invention to provide an optical waveguide device which can facilitate the work of applying the adhesive to the inner surface of an element inserting groove.

In accordance with an aspect of the present invention, there is provided an optical waveguide device comprising a package housing having an element mounting surface, an element inserting groove opening to said element mounting surface, and a cutout as a space opening to an inner surface of said element inserting groove; and an optical waveguide element having a dielectric substrate, an optical waveguide formed in a surface of said dielectric substrate, and an electrode formed over the surface of said dielectric substrate, said optical waveguide element being inserted and fixed in said element inserting groove of said package housing by using an adhesive. The cutout may be formed so as to open also to the element mounting surface.

According to this optical waveguide device, in applying the adhesive to the inner surface of the element inserting groove and next inserting the optical waveguide element into the element inserting groove, the adhesive flows into the cutout formed in the package housing so as to be exposed into the element inserting groove even if the adhesive is erroneously applied to the side surface of the element inserting groove or applied in an excess amount. Accordingly, it is possible to reduce the possibility that the adhesive may flow up through a gap between the opposed side surfaces of the element inserting groove and the optical waveguide element to the element mounting surface by capillarity.

Further, it is unnecessary to pay close attention to erroneous application of the adhesive to the side surface of the element inserting groove, and it is also unnecessary to precisely control the amount of the adhesive to be applied. Accordingly, the work of applying the adhesive can be easily carried out. Particularly in the case that the cutout is formed so as to open also to the element mounting surface, the cutout can be utilized as a working space for application of the adhesive, thereby further facilitating the adhesive application work.

In accordance with another aspect of the present invention, there is provided an optical waveguide device comprising a package housing having an element mounting surface and an element inserting groove opening to said element mounting surface; and an optical waveguide element having a dielectric substrate, an optical waveguide formed in a surface of said dielectric substrate, an electrode formed over the surface of said dielectric substrate, and a cutout as a space exposed to an inner surface of said element inserting groove, said optical waveguide element being inserted and fixed in said element inserting groove of said package housing by using an adhesive.

According to this optical waveguide device, in applying the adhesive to the inner surface of the element inserting groove and next inserting the optical waveguide element into the element inserting groove, the adhesive flows into the cutout formed on the optical waveguide element even if the adhesive is erroneously applied to the side surface of the element inserting groove or applied in an excess amount. Accordingly, it is possible to reduce the possibility that the adhesive may flow up through a gap between the opposed side surfaces of the element inserting groove and the optical waveguide element to the element mounting surface by capillarity.

Further, it is unnecessary to pay close attention to erroneous application of the adhesive to the side surface of the element inserting groove, and it is also unnecessary to precisely control the amount of the adhesive to be applied. Accordingly, the work of applying the adhesive can be easily carried out.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 17 is a sectional view showing a fabrication method for a package housing in the fifth preferred embodiment;

FIG. 18 is a sectional view showing another fabrication method for the package housing in the fifth preferred embodiment;

DETAILED DESCRIPTION OF THE PREFERRED EMBODIMENTS

Some preferred embodiments of the present invention will now be described in detail with reference to the attached drawings.

(First Preferred Embodiment)

Figure 1:
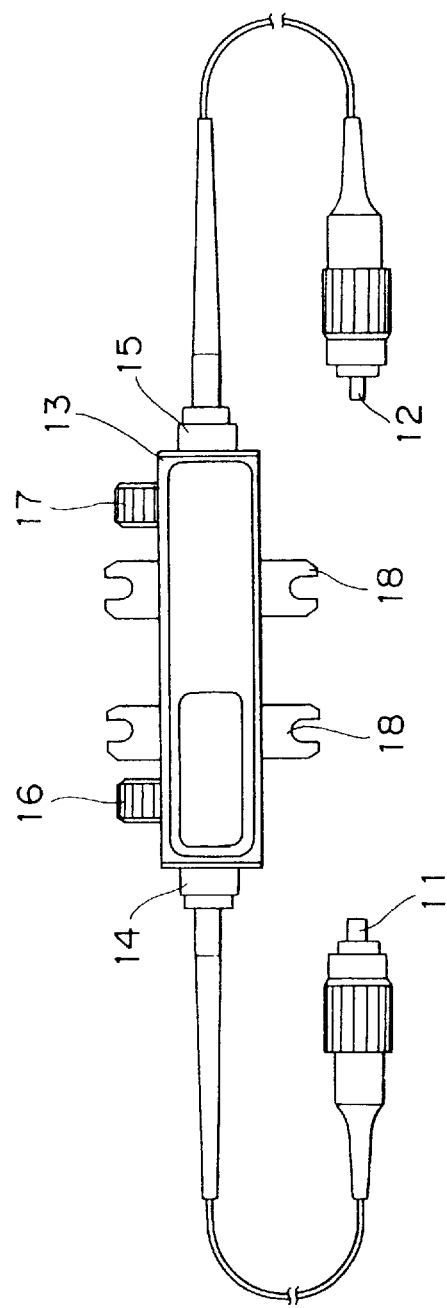
FIG. 1 is a plan view showing the appearance of a first preferred embodiment of the present invention.

FIG. 1 is a plan view showing an external configuration of an optical modulator as an example of the optical waveguide device according to the present invention. In this optical modulator, light received by an input port 11 is modulated and the modulated light is output from an output port 12. In this preferred embodiment, the ports 11 and 12 are optical connectors. This optical modulator has a package housing 13 of metal in which a modulator chip as an optical waveguide element is accommodated. Pigtail type of fiber assemblies 14 and 15 are provided at the opposite ends of the package housing 13 to respectively connect the ports 11 and 12 to the package housing 13. Connectors 16 and 17 for signals are provided on one side surface of the package housing 13. Metal fittings 18 are fixed at the bottom of the package housing 13 to fix the package housing 13 to a case or the like not shown.

Figure 2:
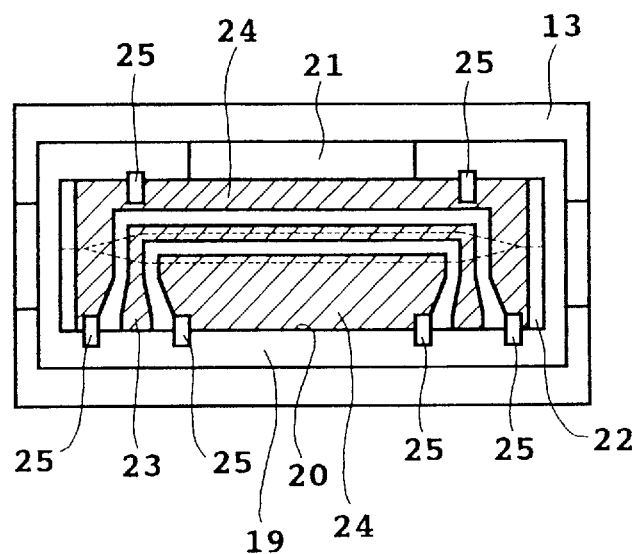
FIG. 2 is a plan view showing an essential part of the first preferred embodiment.
Figure 3:
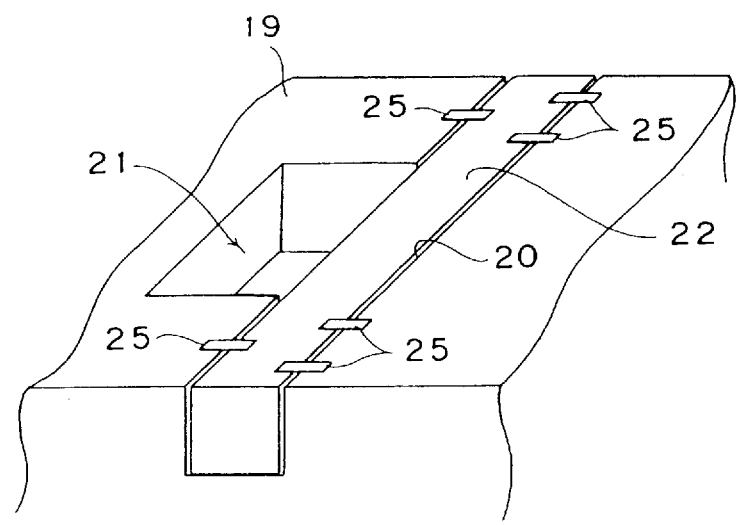
FIG. 3 is a perspective view showing the essential part of the first preferred embodiment.

FIG. 2 is a plan view showing an internal configuration of the optical modulator shown in FIG. 1, and FIG. 3 is an enlarged perspective view of an essential part in FIG. 2. The package housing 13 has a side wall and an element mounting surface 19 formed inside of the side wall. The element mounting surface 19 is formed with an element inserting groove 20 having a substantially rectangular cross section. The package housing 13 is formed with a cutout 21 having the same depth as that of the element inserting groove 20 and opening both to one side surface of the element inserting groove 20 and to the element mounting surface 19. The cutout 21 is formed at a position between connecting portions between the element mounting surface 19 and a ground electrode 24.

A Mach-Zehnder modulator chip 22 as the optical waveguide element is inserted and fixed in the element inserting groove 20. The modulator chip 22 is configured by forming an optical waveguide having a Y-branch portion and a Y-junction portion (shown by broken lines in FIG. 2) in the surface of a dielectric substrate formed of a Z-cut lithium niobate ($LiNbO_3$) crystal, forming a buffer layer of $SiO_2$ on the optical waveguide, and forming a signal electrode 23 and ground electrodes 24 on the buffer layer so as to correspond to the optical waveguide. The optical waveguide is formed by thermal diffusion of Ti (titanium), for example, into the surface of the dielectric substrate to thereby increase the refractive index.

The signal electrode 23 and the ground electrodes 24 are formed by vapor deposition of gold (Au), for example. The opposite ends of the optical waveguide are optically connected to the input port 11 and the output port 12 shown in FIG. 1. While FIG. 2 shows a three-electrode configuration having two ground electrodes 24, a single ground electrode may be applied. The modulator chip 22 is designed so that a voltage applied to the signal electrode 23 is controlled to adjust the refractive index of the optical waveguide, thereby performing a switching operation or a modulating operation.

Light entering the optical waveguide from its one end is branched into two beams at the Y-branch portion to reach a pair of arm portions of the optical waveguide. At this time, a drive voltage is applied to the electrode 23, so that a phase difference is produced between the two beams in the two arm portions by the electro-optical effect (the directions of electric fields at the two arm portions are opposite to each other, so that the refractive indices of the two arm portions change in opposite directions). These two beams are combined into one beam at the Y-junction portion, and this beam is taken out as an optical signal output. By applying the drive voltage so that the phase difference between the two beams becomes zero or $\pi$, an ON-OFF digital signal, for example, can be obtained.

The modulator chip 22 is formed in the shape of elongated rectangular rod having a width of 1 mm, a height (depth) of 1 mm, and a length of 60 mm, for example. The element inserting groove 20 formed on the element mounting surface 19 of the package housing 13 has a width slightly larger than that of the modulator chip 22 and a depth substantially equal to that of the modulator chip 22. The modulator chip 22 is fixed to the package housing 13 by applying an adhesive to the inner surface (bottom surface) of the element inserting groove 20 with an adhesive applicator rod and thereafter inserting the modulator chip 22 into the element inserting groove 20. The ground electrode 24 of the modulator chip 22 is electrically connected to a portion of the element mounting surface 19 corresponding to the ground electrode 24 by bonding or ribbons (wires) 25. The signal electrode 23 of the modulator chip 22 is electrically connected to a voltage applying terminal insulated from the package housing 13.

According to the first preferred embodiment, the package housing 13 has the cutout 21 as a rectangular prismatic space opening both to one side surface of the element inserting groove 20 and to the element mounting surface 19 and having substantially the same depth as that of the element inserting groove 20. Accordingly, in applying the adhesive to the bottom surface of the element inserting groove 20 and next inserting the modulator chip 22 into the element inserting groove 20, an unrequired part of the adhesive flows into the cutout 21 even if the adhesive is erroneously applied also to the side surface of the element inserting groove 20 or if the adhesive is applied in an excess amount. Accordingly, it is possible to reduce the possibility that the adhesive may rise in a gap defined between the opposed side surfaces of the element inserting groove 20 and the modulator chip 22 by capillarity to reach the element mounting surface 19. As a result, good high-frequency characteristics, reliability, and bonding ability can be realized.

Further, it is unnecessary to pay close attention to erroneous application of the adhesive to the side surface of the element inserting groove 20, and it is also unnecessary to so precisely control the amount of the adhesive to be applied. Accordingly, the work of applying the adhesive can be easily carried out. In particular, the cutout 21 can be utilized as a working space for application of the adhesive, thereby making the application work for the adhesive easier and improving exactness of the application amount and the application position of the adhesive. Thus, good characteristics can be realized.

Figure 4:
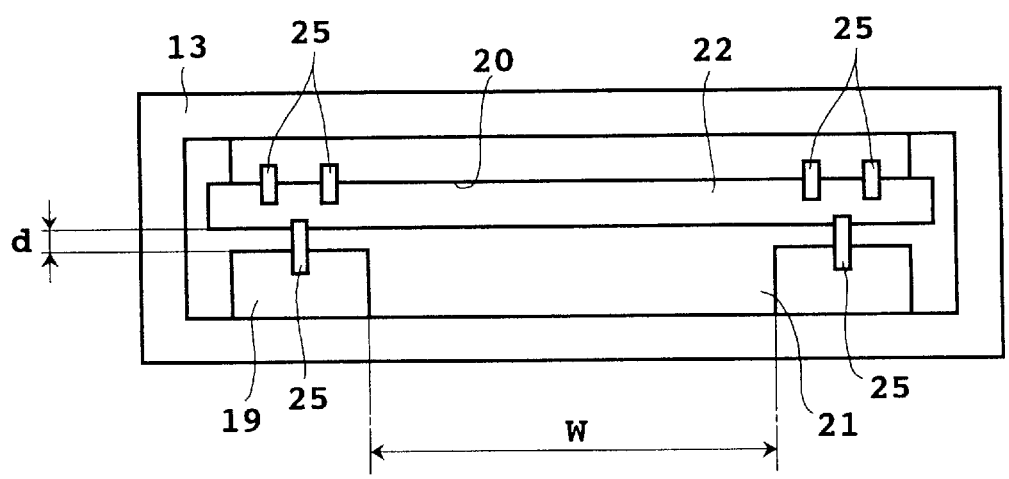
FIG. 4 is a plan view showing the configuration of an optical waveguide device used to perform an experiment in the first preferred embodiment.

There will now be considered a dimension between the modulator chip 22 and one side surface of the element inserting groove 20 and a dimension of the cutout 21 in its longitudinal direction (the longitudinal direction of the modulator chip 22). As shown in FIG. 4, the dimension between the modulator chip 22 and the side surface of the element inserting groove 20 is denoted by d, and the longitudinal dimension of the cutout 21 is denoted by W.

FIGS. 5 to 9 are graphs showing the results of experimental measurement of an electricity transmission characteristic ($S_{21}$ characteristic) of the optical waveguide device. In each graph, the vertical axis represents electricity transmission characteristic (dB), and the horizontal axis represents frequency (GHz). In this measurement, only the dimension d between the modulator chip 22 and the side surface of the element inserting groove 20 was changed in the condition that the longitudinal dimension W of the cutout 21 was set to zero, i.e., the cutout 21 was not formed.

Figure 5:
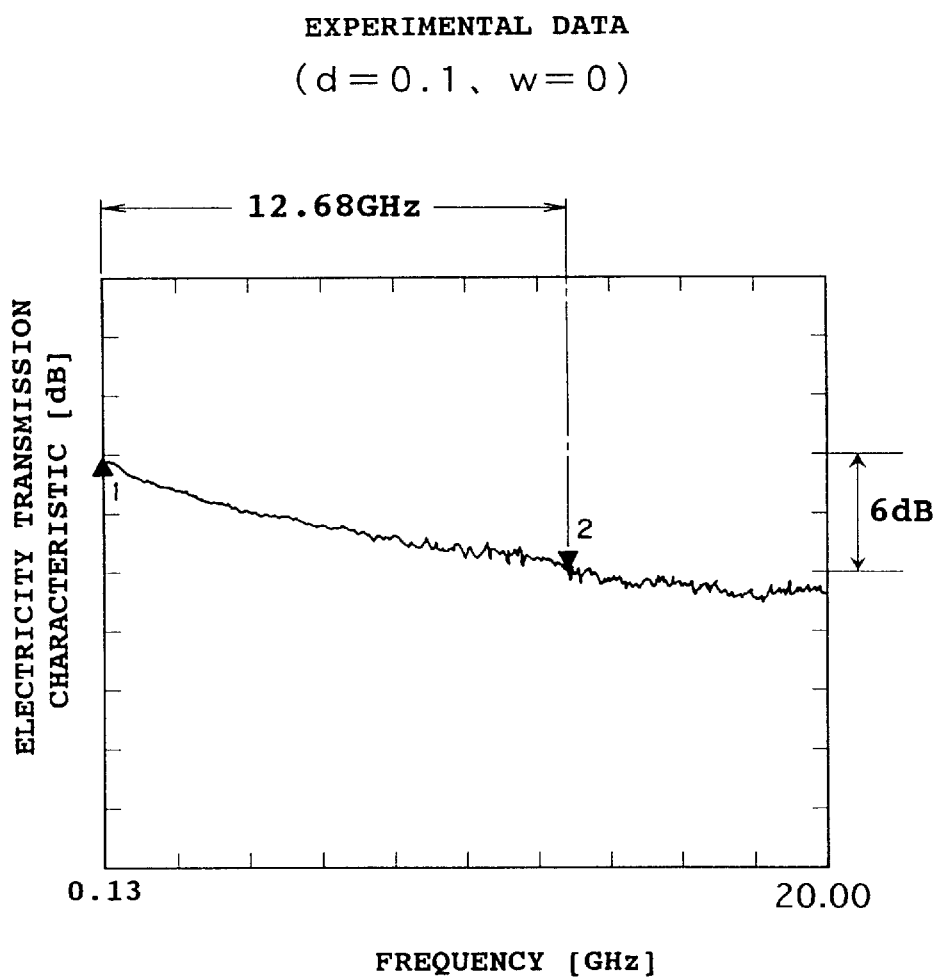
FIG. 5 is a graph showing experimental data (d=0.1, W=0) in the first preferred embodiment.
Figure 6:
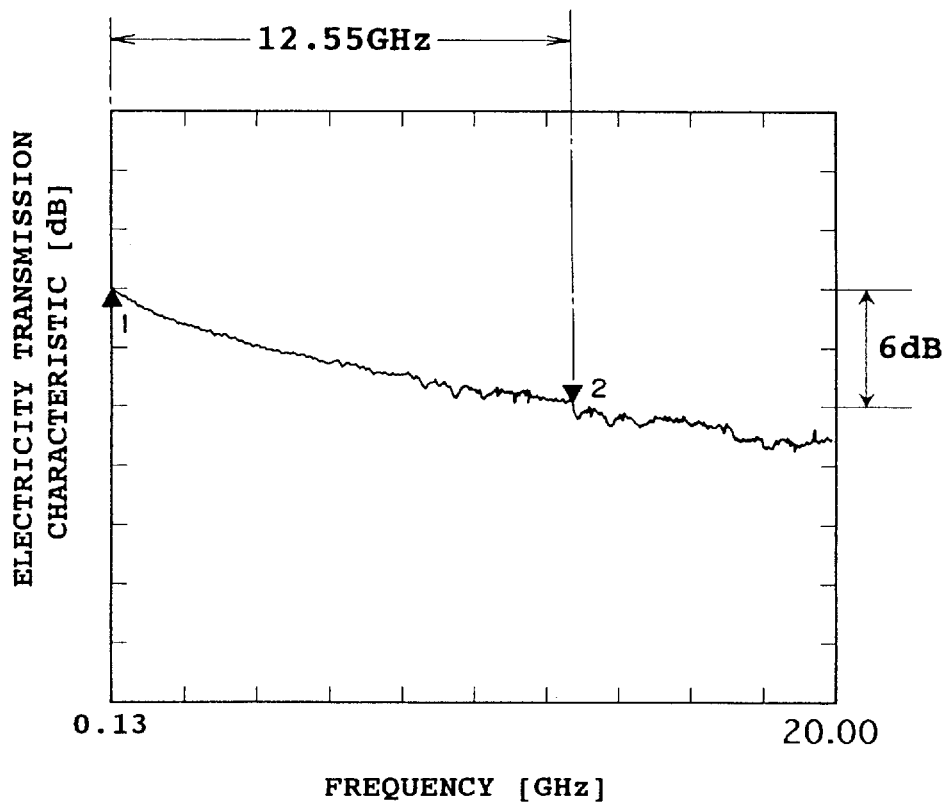
FIG. 6 is a graph showing experimental data (d=0.2, W=0) in the first preferred embodiment.
Figure 7:
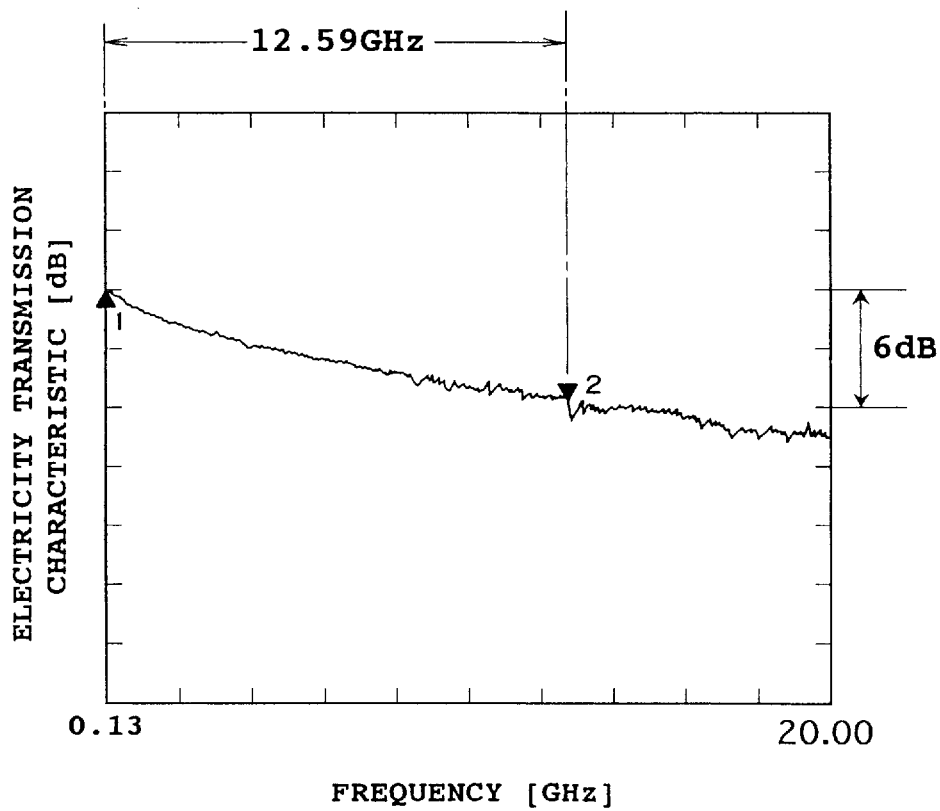
FIG. 7 is a graph showing experimental data (d=0.3, W=0) in the first preferred embodiment.
Figure 8:
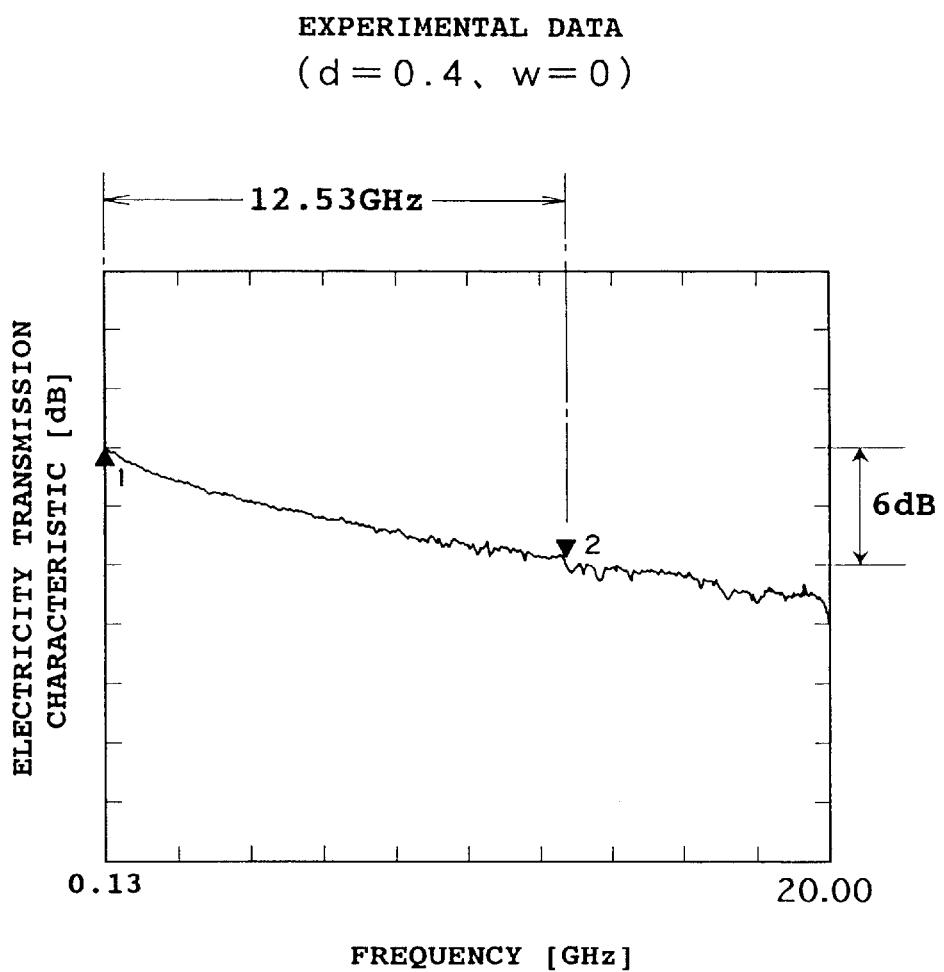
FIG. 8 is a graph showing experimental data (d=0.4, W=0) in the first preferred embodiment.
Figure 9:
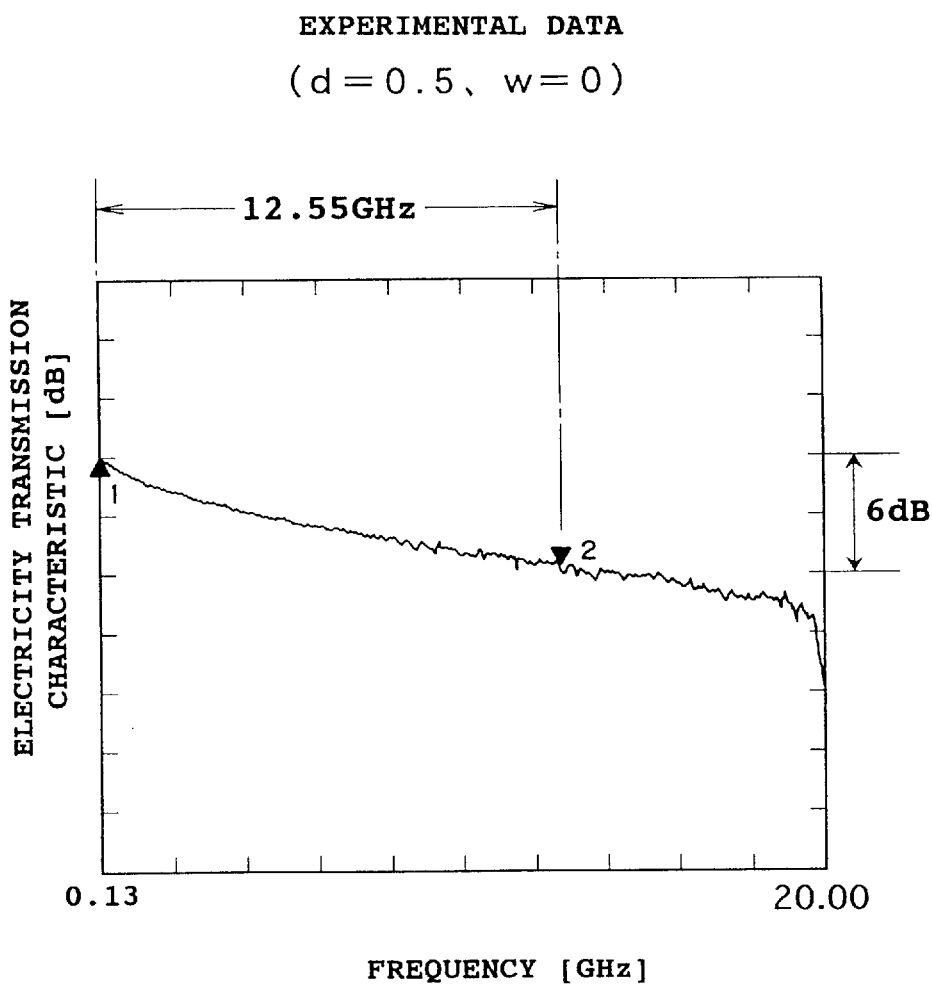
FIG. 9 is a graph showing experimental data (d=0.5, W=0) in the first preferred embodiment.

FIG. 5 shows a result in the case of d=0.1 mm; FIG. 6 shows a result in the case of d=0.2 mm; FIG. 7 shows a result in the case of d=0.3 mm; FIG. 8 shows a result in the case of d=0.4 mm; and FIG. 9 shows a result in the case of d=0.5 mm. As apparent from these figures, it is understood that $S_{21}$ characteristic values (frequency ranges from the start of measurement to a decrease of 6 dB) are substantially equal in the case of changing the dimension d from 0.1 mm to 0.5 mm, and that there is no problem on the characteristic in the range of the dimension d at least from 0.1 mm to 0.5 mm.

Figure 10:
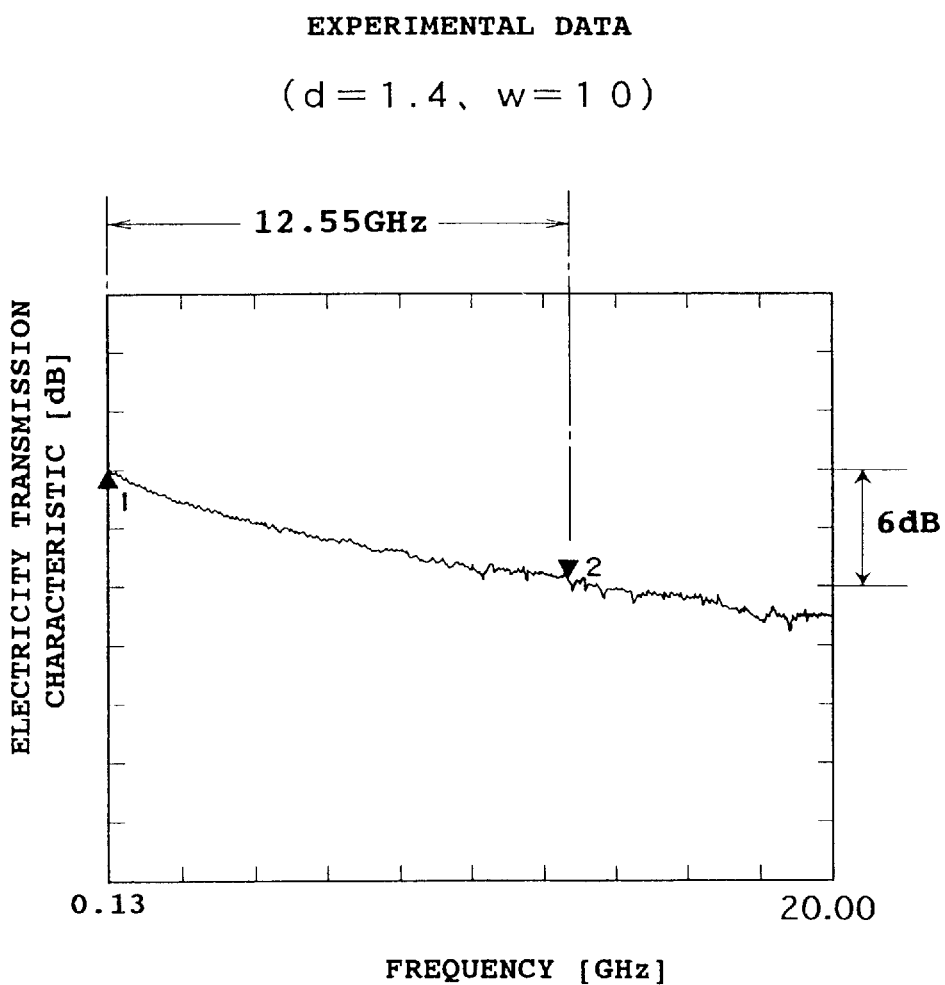
FIG. 10 is a graph showing experimental data (d=1.4, W=10) in the first preferred embodiment.
Figure 11:
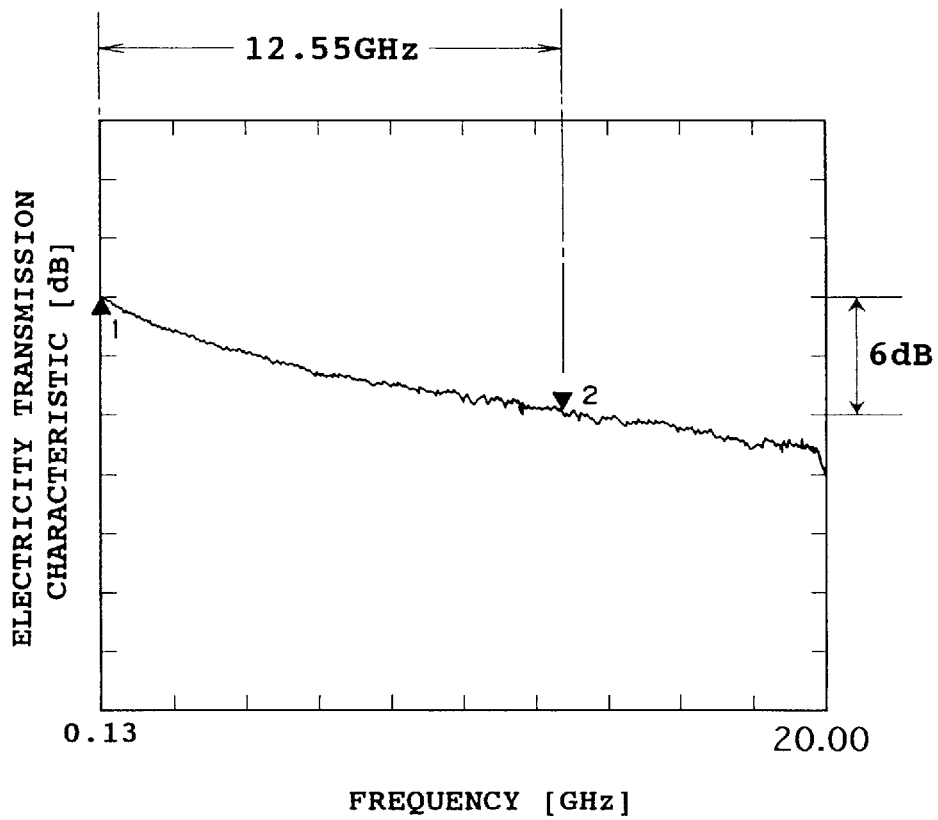
FIG. 11 is a graph showing experimental data (d=1.4, W=20) in the first preferred embodiment.
Figure 12:
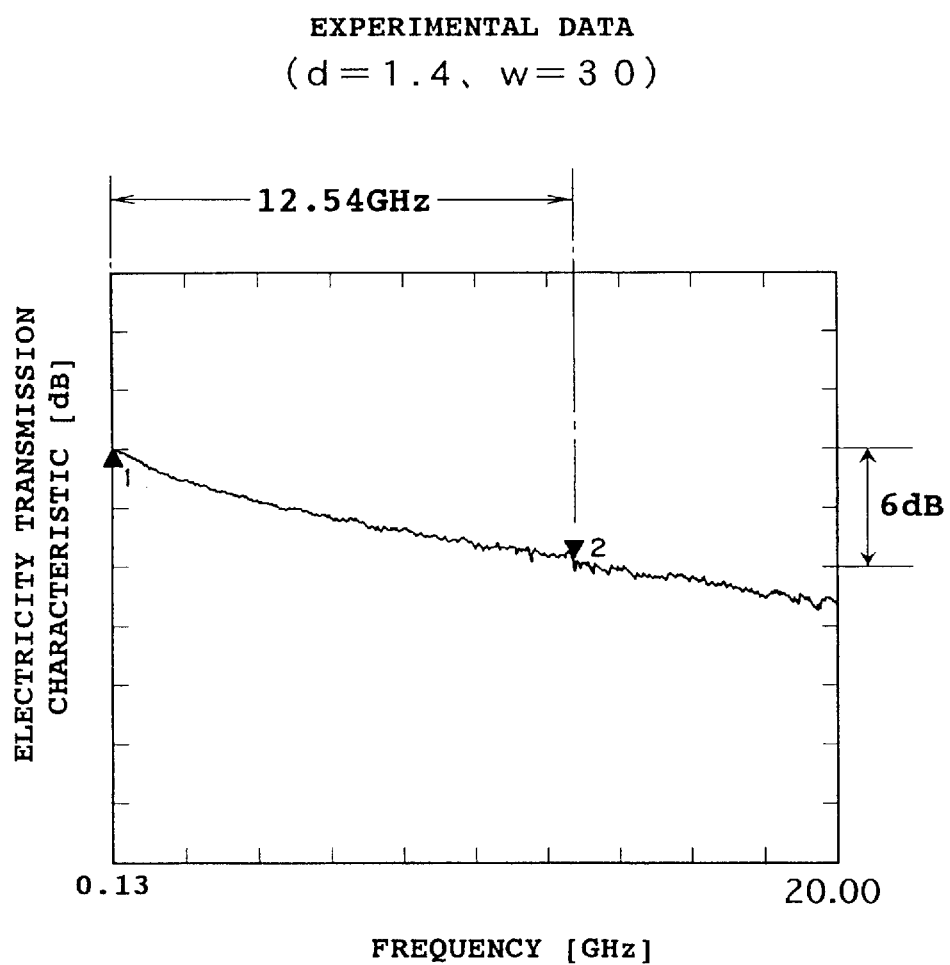
FIG. 12 is a graph showing experimental data (d=1.4, W=30) in the first preferred embodiment.

FIGS. 10 to 12 are graphs showing the results of experimental measurement of an electricity transmission characteristic ($S_{21}$ characteristic) of the optical waveguide device. In each graph, the vertical axis represents electricity transmission characteristic (dB), and the horizontal axis represents frequency (GHz). In this measurement, only the longitudinal dimension W of the cutout 21 was changed in the condition that the dimension d between the modulator chip 22 and the side surface of the element inserting groove 20 was set at 1.4 mm.

FIG. 10 shows a result in the case of W=10 mm; FIG. 11 shows a result in the case of W=20 mm; and FIG. 12 shows a result in the case of W=30 mm. As apparent from these figures, it is understood that $S_{21}$ characteristic values (frequency ranges from the start of measurement to a decrease of 6 dB) are substantially equal in the case of changing the dimension W from 10 mm to 30 mm, and that there is no problem on the characteristic in the range of the dimension W at least from 10 mm to 30 mm.

(Second Preferred Embodiment)

Figure 13:
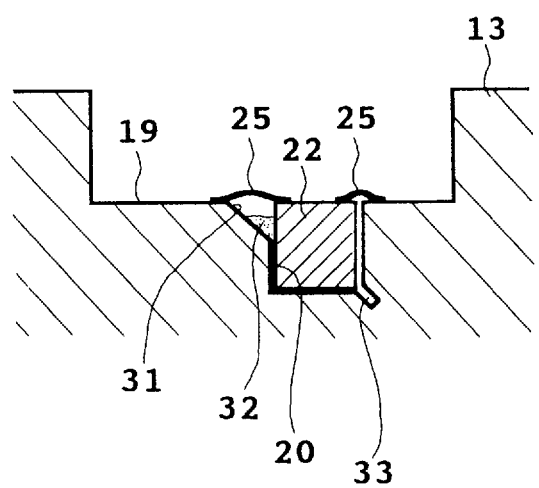
FIG. 13 is a sectional view showing an essential part of a second preferred embodiment of the present invention.

FIG. 13 is a sectional view showing the configuration of an essential part of a second preferred embodiment according to the present invention. The second preferred embodiment is a partial modification of the first preferred embodiment. In the second preferred embodiment, the rectangular prismatic cutout 21 employed in the first preferred embodiment is replaced by a triangular prismatic cutout 31. The cutout 31 is formed by chamfering a ridge portion between the element mounting surface 19 and one side surface of the element inserting groove 20. Such chamfering may be carried out by using an end mill, for example, and the dimension of the chamfered portion is preferably set to 0.2 mm (C0.2) or more.

Even when an adhesive 32 for fixing the modulator chip 22 in the element inserting groove 20 rises in the gap between the modulator chip 22 and the element inserting groove 20 by capillarity, the adhesive 32 stops rising to stay in the cutout 31, and does not reach the element mounting surface 19. Accordingly, no degradation of characteristics occurs, and the application work for the adhesive 32 can be facilitated. Further, the cutout 31 can be formed more simply than the cutout 21 in the first preferred embodiment. In addition, an electrical discharge machined groove 33 is formed by electrical discharge machining at an intersecting portion between the other side surface and the bottom surface of the element inserting groove 20. The groove 33 is inclined downward with respect to the other side surface and the bottom surface of the element inserting groove 20, thereby preventing a rise of the adhesive 32 by capillarity in a gap defined between the other side surface of the element inserting groove 20 and the corresponding side surface of the modulator chip 22. The other configurations and effects are similar to those of the first preferred embodiment, so the description thereof will be omitted herein.

(Third Preferred Embodiment)

Figure 14:
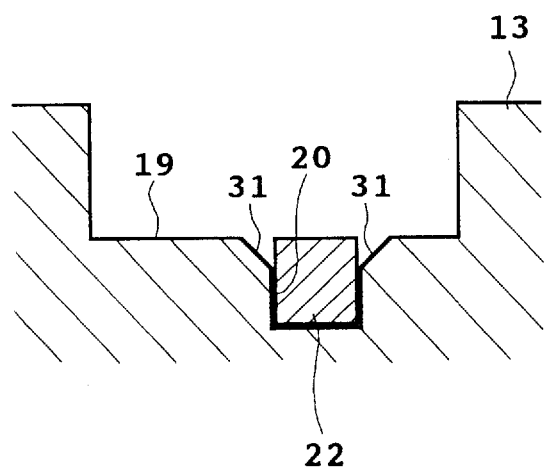
FIG. 14 is a sectional view showing an essential part of a third preferred embodiment of the present invention.

FIG. 14 is a sectional view showing the configuration of an essential part of a third preferred embodiment according to the present invention. The third preferred embodiment is a partial modification of the second preferred embodiment. In the third preferred embodiment, two cutouts 31 are formed. More specifically, one of the two cutouts 31 is formed by chamfering a ridge portion between the element mounting surface 19 and one side surface of the element inserting groove 20 as similarly to the second preferred embodiment, and the other cutout 31 is formed by chamfering a ridge portion between the element mounting surface 19 and the other side surface of the element inserting groove 20. The other configurations and effects are similar to those of the first and second preferred embodiments except that the electrical discharge machined groove 33 is not formed, so the description thereof will be omitted herein.

(Fourth Preferred Embodiment)

Figure 15:
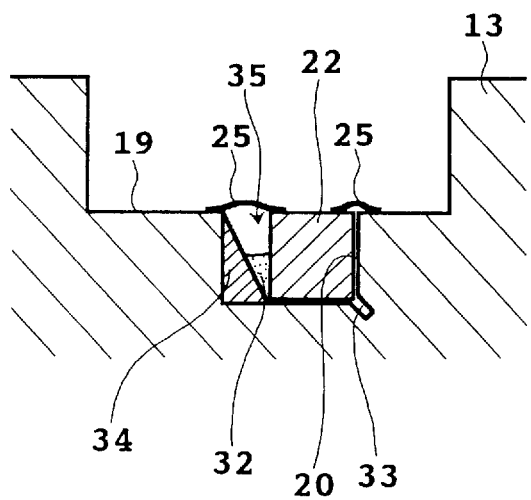
FIG. 15 is a sectional view showing an essential part of a fourth preferred embodiment of the present invention.

FIG. 15 is a sectional view showing the configuration of an essential part of a fourth preferred embodiment according to the present invention. The fourth preferred embodiment is a partial modification of the second preferred embodiment. In the second preferred embodiment, the cutout 31 is formed by chamfering a ridge portion between the element mounting surface 19 and one side surface of the element inserting groove 20. In contrast therewith, according to the fourth preferred embodiment, the width of the element inserting groove 20 is set sufficiently larger than the width of the modulator chip 22, so as to define a rectangular prismatic space between the modulator chip 22 and one side surface of the element inserting groove 20. A triangular prismatic block 34 is inserted in this rectangular prismatic space of the element inserting groove 20, and is fixed in this space by brazing with use of a brazing material or by adhesion with use of a conductive adhesive or the like. By the use of the block member 34, a triangular prismatic cutout 35 is formed as the remainder of the above-mentioned rectangular prismatic space of the element inserting groove 20.

While the triangular prismatic cutout 35 in the fourth preferred embodiment is larger than the triangular prismatic cutout 31 in the second preferred embodiment, there is a mere variation of the present invention. For example, the cutout 35 may be formed as a triangular prismatic cutout similar in size to the triangular prismatic cutout 31 in the second preferred embodiment by using a trapezoidal prismatic block member (not shown). Further, the cutout 35 may be formed by chamfering as in the second preferred embodiment. The other configurations and effects are similar to those of the first and second preferred embodiments, so the description thereof will be omitted herein.

(Fifth Preferred Embodiment)

Figure 16:
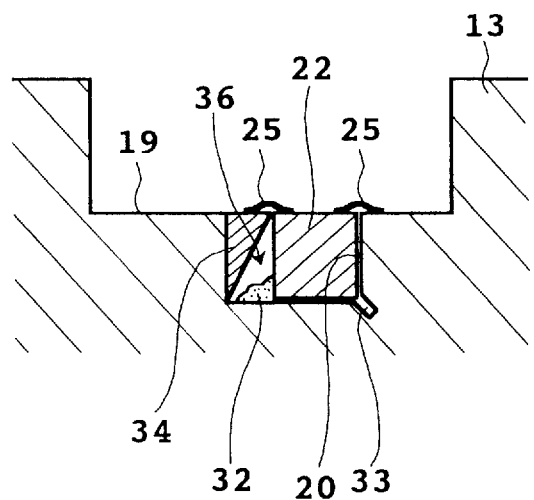
FIG. 16 is a sectional view showing an essential part of a fifth preferred embodiment of the present invention.

FIG. 16 is a sectional view showing the configuration of an essential part of a fifth preferred embodiment according to the present invention. The fifth preferred embodiment is a partial modification of the fourth preferred embodiment. In the fourth preferred embodiment, the triangular prismatic cutout 35 is formed as a space opening to the element mounting surface 19, that is, the cutout 35 is formed so that one side surface of the element inserting groove 20, i.e., the oblique surface of the block member 34, is gradually separate from the other side surface of the element inserting groove 20, that is, from the corresponding side surface of the modulator chip 22, with a change in position from the bottom surface of the element inserting groove 20 to the element mounting surface 19. Conversely, according to the fifth preferred embodiment, a triangular prismatic cutout 36 is formed so that one side surface of the element inserting groove 20, i.e., the oblique surface of the block member 34, is gradually close to the other side surface of the element inserting groove 20, that is, to the corresponding side surface of the modulator chip 22, with a change in position from the bottom surface of the element inserting groove 20 to the element mounting surface 19.

As similar to the fourth preferred embodiment, the cutout 36 is formed by setting the width of the element inserting groove 20 larger than the width of the modulator chip 22, inserting the triangular prismatic block member 34 into the element inserting groove 20 with the orientation of the block member 34 being reversed to that of the fourth preferred embodiment, and fixing the block member 34 by brazing with use of a brazing material or by adhesion with use of a conductive adhesive or the like. Alternatively, the cutout 36 may be formed by obliquely cutting one side surface of the element inserting groove 20 rather than by using the block member 34. The other configurations and effects are similar to those of the first and fourth preferred embodiments, so the description thereof will be omitted herein.

FIGS. 17 and 18 show different modifications of the fifth preferred embodiment such that the package housing 13 and the block member 34 in the fifth preferred embodiment have been modified. In the modification of FIG. 17, the width of the element inserting groove 20 of the package housing 13 is set larger than the width of the groove 20 shown in FIG. 16, and a trapezoidal prismatic block member 37A is fixed in the groove 20. In the modification of FIG. 18, a block member 37B having such a shape that a part of the side wall of the package housing 13 is integrated with the block member 37A shown in FIG. 17 is used, and the block member 37B is fixed to the bottom surface of the groove 20 whose one side surface is absent in this case. According to these modifications, machining of the block members 37A and 37B and the package housing 13 and the other working including adhesion can be made easier.

(Sixth Preferred Embodiment)

Figure 19:
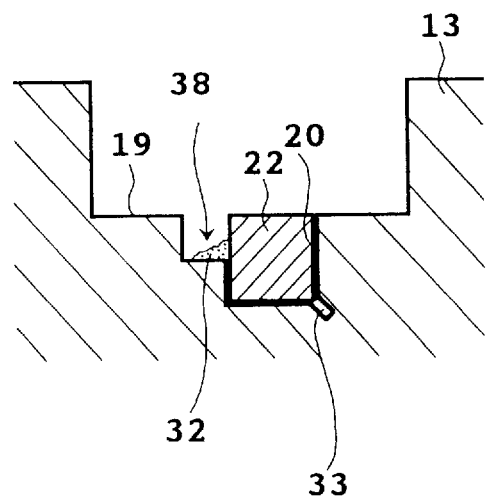
FIG. 19 is a sectional view showing an essential part of a sixth preferred embodiment of the present invention.

FIG. 19 is a sectional view showing the configuration of an essential part of a sixth preferred embodiment according to the present invention. The sixth preferred embodiment is a partial modification of the first preferred embodiment. In the first preferred embodiment, the rectangular prismatic cutout 21 has a length smaller than the length of the element inserting groove 20, and the bottom surface of the cutout 21 is flush with the bottom surface of the groove 20. In contrast therewith, according to the sixth preferred embodiment, a rectangular prismatic cutout 38 has a length equal to the length of the element inserting groove 20, and the bottom surface of the cutout 38 is higher in level that the bottom surface of the groove 20, that is, the depth of the cutout 38 is smaller than the depth of the groove 20.

According to the sixth preferred embodiment, even when the adhesive 32 for fixing the modulator chip 22 in the element inserting groove 20 rises in the gap between the modulator chip 22 and the groove 20 by capillarity, the adhesive 32 stops rising to stay in the cutout 38, and does not reach the element mounting surface 19. Accordingly, no degradation of characteristics occurs and the application work for the adhesive 32 is easy. Further, the cutout 38 can be formed more simply than the cutout 21 in the first preferred embodiment. In addition, an electrical discharge machined groove 33 is formed by electrical discharge machining at an intersecting portion between the other side surface and the bottom surface of the element inserting groove 20. The groove 33 is inclined downward with respect to the other side surface and the bottom surface of the element inserting groove 20, thereby preventing a rise of the adhesive 32 by capillarity in a gap defined between the other side surface of the groove 20 and the corresponding side surface of the modulator chip 22. The other configurations and effects are similar to those of the first preferred embodiment, so the description thereof will be omitted herein.

(Seventh Preferred Embodiment)

Figure 20:
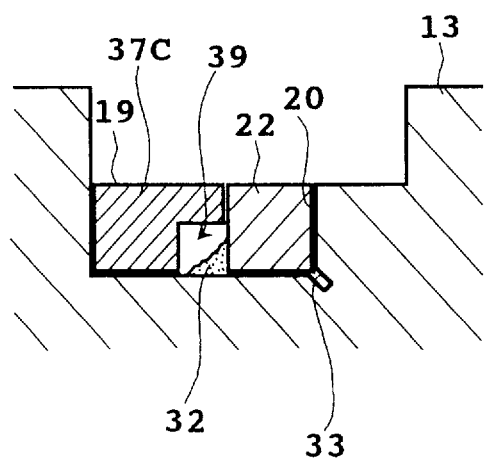
FIG. 20 is a sectional view showing an essential part of a seventh preferred embodiment of the present invention.

FIG. 20 is a sectional view showing the configuration of an essential part of a seventh preferred embodiment according to the present invention. The seventh preferred embodiment is a partial modification of the sixth preferred embodiment. In the sixth preferred embodiment, the cutout 38 is formed as a groove opening to the element mounting surface 19. In contrast therewith, according to the seventh preferred embodiment, a cutout 39 is formed as a groove closed on the element mounting surface 19 side and exposed to the bottom surface of the element inserting groove 20.

The cutout 39 is formed by setting the width of the element inserting groove 20 sufficiently larger than the width of the modulator chip 22, inserting a block member 37C having a given step into the groove 20, and fixing the block member 37C by brazing with use of a brazing material or by adhesion with use of a conductive adhesive. Alternatively, the cutout 39 may be formed by cutting rather than using the block member 37C. The other configurations and effects are similar to those of the first and sixth preferred embodiments, so the description thereof will be omitted herein.

(Eighth Preferred Embodiment)

Figure 21:
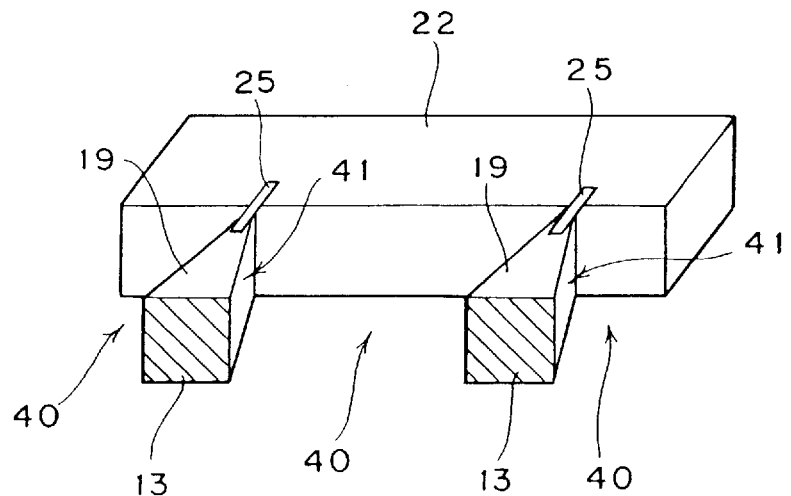
FIG. 21 is a perspective view showing an essential part of an eighth preferred embodiment of the present invention.

FIG. 21 is a perspective view showing the configuration of an essential part of an eighth preferred embodiment according to the present invention. The eighth preferred embodiment is a partial modification of the first preferred embodiment. In the first preferred embodiment, the single rectangular prismatic cutout 21 is formed at a portion of the package housing 13 except the bonding portions between the element mounting surface 19 and the ground electrode 24 (i.e., at a portion of the package housing 13 interposed between the pair of bonding portions). In contrast therewith, according to the eighth preferred embodiment, a plurality of cutouts 40 are formed at portions of the package housing 13 except the bonding portions between the element mounting surface 19 and the ground electrode 24.

Each bonding portion shown by reference numeral 41 between any two adjacent ones of the cutouts 40 has a tapering shape (triangular shape as viewed in plan) in such a manner that the width is gradually reduced toward the modulator chip 22. The front end of each tapering portion 41 is in line contact with (or close to) the modulator chip 22, and the element mounting surface 19 is connected at the front end of each tapering portion 41 through the ribbon 25 to the ground electrode 24 of the modulator chip 22. In the first preferred embodiment, there is a possibility that capillarity may occur in a gap between the modulator chip 22 and a portion of the side surface of the groove 20 except the side opening of the cutout 21. To the contrary, according to the eighth preferred embodiment, there is almost no possibility of capillarity because the front end of each tapering portion 41 is in line contact with (or close to) the modulator chip 22. The other configurations and effects are similar to those of the first preferred embodiment, so the description thereof will be omitted herein.

(Ninth Preferred Embodiment)

Figure 22:
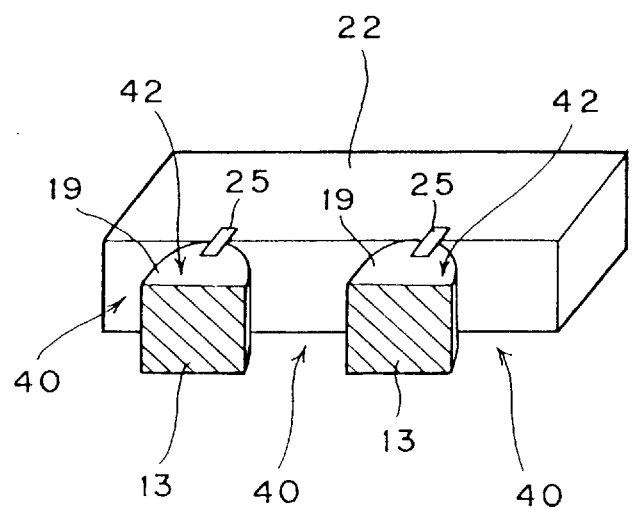
FIG. 22 is a perspective view showing an essential part of a ninth preferred embodiment of the present invention.

FIG. 22 is a perspective view showing the configuration of an essential part of a ninth preferred embodiment according to the present invention. The ninth preferred embodiment is a partial modification of the eighth preferred embodiment. In the eighth preferred embodiment, each tapering portion 41 is formed between the adjacent cutouts 40. In contrast therewith, according to the ninth preferred embodiment, each portion between the adjacent cutouts 40 is formed as an arcuate portion 42 so as to be convex toward the modulator chip 22. As similar to the eighth preferred embodiment, the front end of each arcuate portion 42 is in line contact with (or close to) the modulator chip 22, so that capillarity hardly occurs. The other configurations and effects are similar to those of the first and eighth preferred embodiments, so the description thereof will be omitted herein.

(Tenth Preferred Embodiment)

Figure 23:
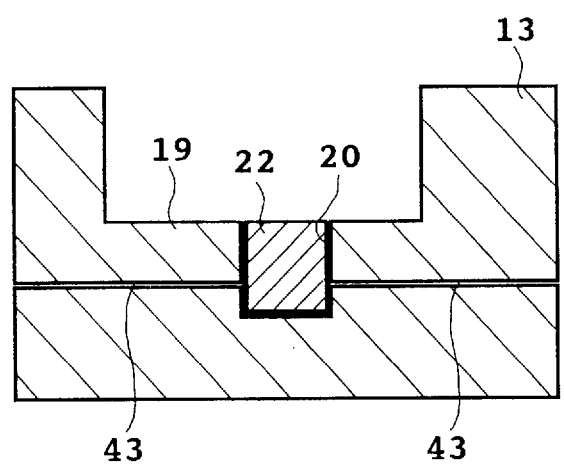
FIG. 23 is a sectional view showing an essential part of a tenth preferred embodiment of the present invention.

FIG. 23 is a sectional view showing the configuration of an essential part of a tenth preferred embodiment according to the present invention. The tenth preferred embodiment is a partial modification of the first preferred embodiment. In the tenth preferred embodiment, a pair of cutouts 43 are formed as slits opening to the opposite side surfaces of the element inserting groove 20 at a position in the vicinity of the bottom surface of the groove 20, extending through the package housing 13, and opening to the opposite outer side surfaces of the package housing 13.

The slit width of each cutout 43 is set smaller than the dimension of the gap between the opposed side surfaces of the modulator chip 22 and the element inserting groove 20. By this setting, capillarity occurs positively in each cutout 43, and the adhesive is positively taken into each cutout 43 by the capillarity. Accordingly, it is possible to reduce the possibility that the adhesive may flow up through the gap between the opposed side surfaces of the modulator chip 22 and the element inserting groove 20 to the element mounting surface 19. The other configurations and effects are similar to those of the first preferred embodiment, so the description thereof will be omitted herein.

(Eleventh Preferred Embodiment)

Figure 24:
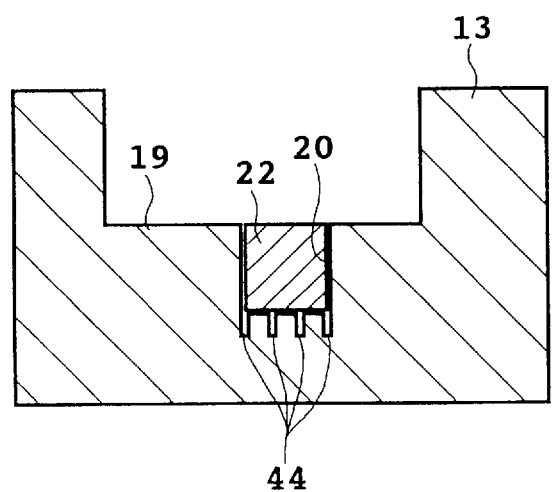
FIG. 24 is a sectional view showing an essential part of an eleventh preferred embodiment of the present invention.

FIG. 24 is a sectional view showing the configuration of an essential part of an eleventh preferred embodiment according to the present invention. The eleventh preferred embodiment is a partial modification of the first preferred embodiment. In the eleventh preferred embodiment, a plurality of cutouts 44 are formed as slits opening to the bottom surface of the element inserting groove 20. An unrequired part of the adhesive flows into the cutouts 44, so that it is possible to reduce the possibility that the adhesive may flow up through the gap between the opposed side surfaces of the modulator chip 22 and the element inserting groove 20 to the element mounting surface 19. The other configurations and effects are similar to those of the first preferred embodiment, so the description thereof will be omitted herein.

(Twelfth Preferred Embodiment)

Figure 25:
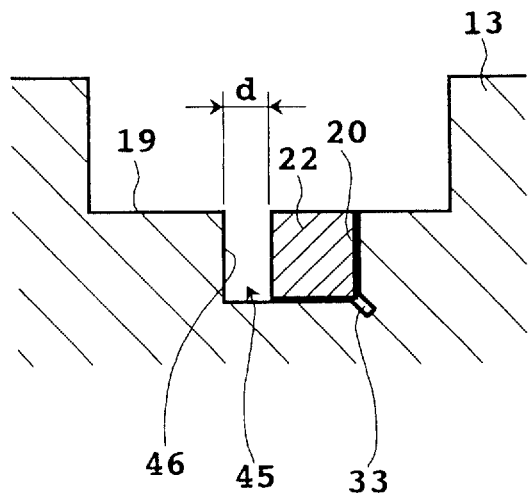
FIG. 25 is a sectional view showing an essential part of a twelfth preferred embodiment of the present invention.
Figure 26:
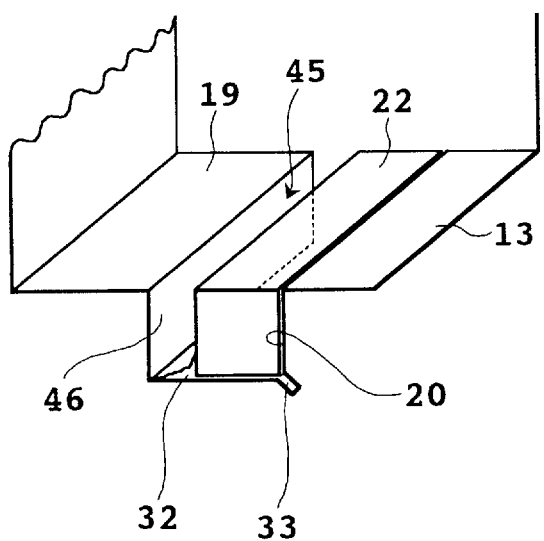
FIG. 26 is a perspective view showing the essential part of the twelfth preferred embodiment.

FIG. 25 is a sectional view showing the configuration of an essential part of a twelfth preferred embodiment according to the present invention, and FIG. 26 is a perspective view of FIG. 25. The twelfth preferred embodiment is a partial modification of the first preferred embodiment and the rectangular prismatic cutout 21 is not employed. In the twelfth preferred embodiment, a cutout 45 is formed as a part of the element inserting groove 20 in such a manner that the bottom surface of the cutout 45 is flush with the bottom surface of the element inserting groove 20, that the longitudinal dimension (length) of the cutout 45 is equal to the longitudinal dimension of the groove 20, and that the dimension d of a gap defined between the side surface of the cutout 45 and the corresponding side surface of the modulator chip 22 is set at 0.2 mm or more.

In other words, the width of the element inserting groove 20 is set larger by 0.2 mm or more than the width of the modulator chip 22. As apparent from FIGS. 5 to 9, the dimension d of the gap between the side surface of the modulator chip 22 and the side surface 46 of the element inserting groove 20 (the side surface of the cutout 45) in the range of 0.1 mm to 0.5 mm has no effects on the characteristic of the optical waveguide device. On the other hand, as the result of a further experiment by the prevent inventor, adhesive flow by capillarity in the above-mentioned gap was observed when the dimension d of this gap is less than 0.2 mm, and was not observed when the dimension d is 0.2 mm or more. Accordingly, by setting the dimension d of the gap between the side surface of the modulator chip 22 and the side surface 46 of the element inserting groove 20 (the side surface of the cutout 45) to 0.2 mm or more, the adhesive is prevented from flowing up to the element mounting surface 19, thereby realizing good characteristics.

(Thirteenth Preferred Embodiment)

Figure 27:
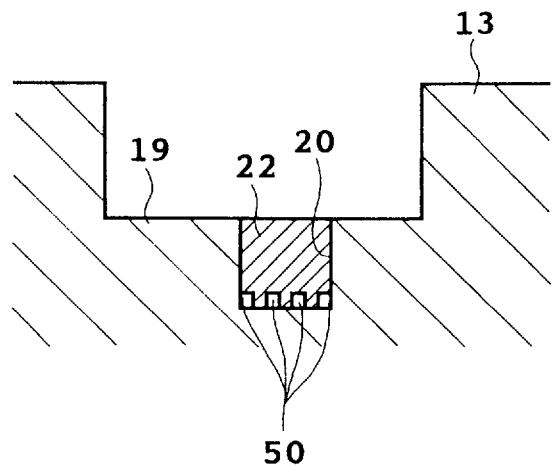
FIG. 27 is a sectional view showing an essential part of a thirteenth preferred embodiment of the present invention.

FIG. 27 is a sectional view showing the configuration of an essential part of a thirteenth preferred embodiment according to the present invention. In the first to twelfth preferred embodiments, the cutouts 21, 31, 35, 36, 38, 39, 40, 43, 44, and 45 are formed in the package housing 13. In contrast therewith, according to the thirteenth preferred embodiment, a plurality of cutouts 50 are formed as slits on the bottom surface of the modulator chip 22. An unrequired part of the adhesive flows into the cutouts 50, so that it is possible to reduce the possibility that the adhesive may flow up through the gap between the opposed side surfaces of the modulator chip 22 and the element inserting groove 20 to the element mounting surface 19. The other configurations and effects are similar to those of the first preferred embodiment, so the description thereof will be omitted herein.

(Fourteenth Preferred Embodiment)

Figure 28:
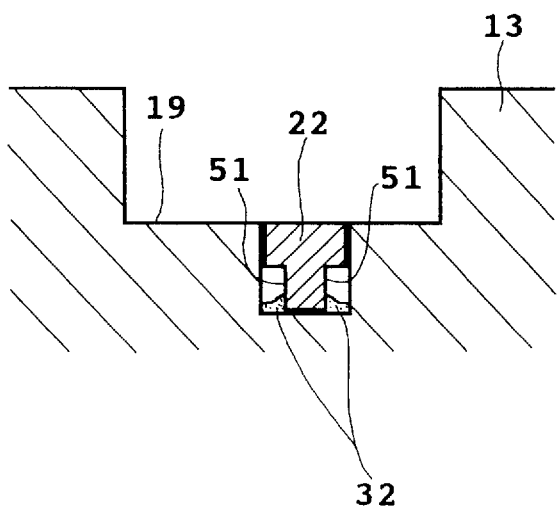
FIG. 28 is a sectional view showing an essential part of a fourteenth preferred embodiment of the present invention.

FIG. 28 is a sectional view showing the configuration of an essential part of a fourteenth preferred embodiment according to the present invention. In contrast with the thirteenth preferred embodiment wherein the plurality of slit-like cutouts 50 are formed on the bottom surface of the modulator chip 22, the fourteenth preferred embodiment is characterized in that a pair of cutouts 51 are formed on the surface of the modulator chip 22 so as to be exposed to both the opposite side surfaces and the bottom surface of the element inserting groove 20. An unrequired part of the adhesive 32 flows into the cutouts 51, so that it is possible to reduce the possibility that the adhesive may flow up through the gap between the opposed side surfaces of the modulator chip 22 and the element inserting groove 20. The other configurations and effects are similar to those of the first preferred embodiment, so the description thereof will be omitted herein.

Figure 29A:
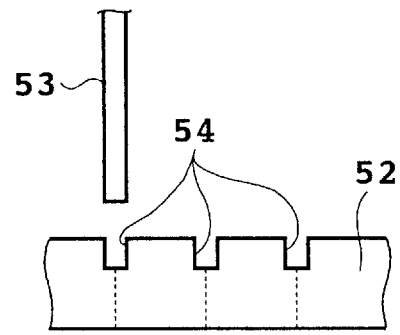
FIGS. 29A to 29C are views illustrating a fabrication process for a modulator chip in the fourteenth preferred embodiment.
Figure 29B:
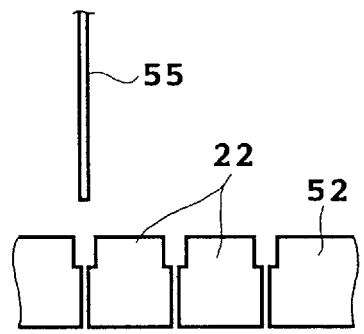
Figure 29C:
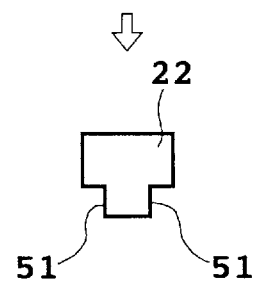

A fabrication method for the modulator chip 22 in the fourteenth preferred embodiment shown in FIG. 28 will now be described with reference to FIGS. 29A to 29C. As shown in FIG. 29A, a plurality of first grooves 54 each having a depth not reaching the front surface of a wafer 52 of a lithium niobate crystal are formed at given intervals on the back surface of the wafer 52 (corresponding to the bottom surface of the chip 22) by using a dicing saw having a first blade 53 with a given thickness. In the next step shown in FIG. 29B, the wafer 52 is cut along the center of the bottom surface of each first groove 54 by using a cutting saw having a second blade 55 with a thickness smaller than the thickness of the first blade 53. As a result, a plurality of modulator chips 22 each having the pair of cutouts 51 as shown in FIG. 29C are obtained.

According to the present invention as described above, a cutout is formed on a package housing or an optical waveguide element. Accordingly, in fixing the optical waveguide element in an element inserting groove formed on the package housing by using an adhesive, it is possible to prevent that the adhesive may flow up through the gap between the opposed side surfaces of the optical waveguide device and the element inserting groove to the element mounting surface by capillarity. It is therefore possible to provide an optical waveguide device having good characteristics, reliability, and bonding ability. Furthermore, the operation of applying the adhesive can be easily carried out.

What is claimed is:

1. An optical waveguide device comprising:

a package housing having an element mounting surface, an element inserting groove opening to said element mounting surface, and a cutout as a space opening to an inner surface of said element inserting groove; and an optical waveguide element having a dielectric substrate, an optical waveguide formed in a surface of said dielectric substrate, and an electrode formed over the surface of said dielectric substrate, said optical waveguide element being inserted and fixed in said element inserting groove of said package housing by using an adhesive.

2. An optical waveguide device according to claim 1, wherein said cutout opens to a side surface of said element inserting groove.

3. An optical waveguide device according to claim 2, wherein said cutout opens also to said element mounting surface.

4. An optical waveguide device according to claim 3, wherein said side surface of said element inserting groove comprises a first side surface and a second side surface opposed to said first side surface, and said cutout is formed by inclining said first side surface with respect to said second side surface.

5. An optical waveguide device according to claim 4, wherein said first side surface of said element inserting groove is gradually separate from said second side surface of said element inserting groove with a change in position from said bottom surface of said element inserting groove to said element mounting surface.

6. An optical waveguide device according to claim 4, wherein said first side surface of said element inserting groove gradually approaches to said second side surface of said element inserting groove with a change in position from said bottom surface of said element inserting groove to said element mounting surface.

7. An optical waveguide device according to claim 3, wherein said cutout is formed by chamfering a ridge portion between said element mounting surface and said side surface of said element inserting groove.

8. An optical waveguide device according to claim 3, wherein said cutout comprises a plurality of cutouts formed adjacent to each other, and a portion of said package housing interposed between any two adjacent ones of said cutouts has an arcuate shape so as to be convex toward said optical waveguide element.

9. An optical waveguide device according to claim 3, wherein said cutout is formed at a portion of said package housing except a connecting portion between said element mounting surface and said electrode.

10. An optical waveguide device according to claim 3, wherein said cutout comprises a plurality of cutouts formed adjacent to each other, and a portion of said package housing interposed between any two adjacent ones of said cutouts has a tapering shape such that the width of said portion is gradually reduced toward said optical waveguide element.

11. An optical waveguide device according to claim 1, wherein said cutout extends between a side surface of said element inserting groove and an outer surface of said package housing.

12. An optical waveguide device according to claim 11, wherein said cutout is formed as a slit, said slit having a width smaller than the dimension of a gap defined between said side surface of said element inserting groove and a side surface of said optical waveguide element opposed thereto.

13. An optical waveguide device according to claim 1, wherein said cutout opens to a bottom surface of said element inserting groove.

14. An optical waveguide device according to claim 1, wherein said cutout comprises a plurality of slits formed on a bottom surface of said element inserting groove.

15. An optical waveguide device comprising:

a package housing having an element mounting surface and an element inserting groove opening to said element mounting surface; and an optical waveguide element having a dielectric substrate, an optical waveguide formed in a surface of said dielectric substrate, an electrode formed over the surface of said dielectric substrate, and a cutout as a space exposed to an inner surface of said element inserting groove, said optical waveguide element being inserted and fixed in said element inserting groove of said package housing by using an adhesive.

16. An optical waveguide device according to claim 15, wherein said cutout is formed so as to be exposed to both a side surface and a bottom surface of said element inserting groove.

17. An optical waveguide device according to claim 15, wherein said cutout comprises a plurality of slits formed on a bottom surface of said optical waveguide element.

18. An optical waveguide device comprising:

a package housing having an element mounting surface and an element inserting groove opening to said element mounting surface; and an optical waveguide element having a dielectric substrate, an optical waveguide formed in a surface of said dielectric substrate, and an electrode formed over the surface of said dielectric substrate, said optical waveguide element being inserted and fixed in said element inserting groove of said package housing by using an adhesive;

wherein the width of said element inserting groove is set larger than the width of said optical waveguide element so that the dimension of a gap defined between a first side surface of said element inserting groove and a side surface of said optical waveguide element opposed to said first side surface becomes 0.2 mm or more in the condition where said optical waveguide element is inserted along a second side surface of said element inserting groove opposed to said first side surface.

* * * * *